(12) United States Patent
Hawkins

(10) Patent No.: US 10,561,071 B2
(45) Date of Patent: Feb. 18, 2020

(54) SELF-PROPELLED TREE TRIMMER

(71) Applicant: Michael Browning Hawkins, Alexandria, VA (US)

(72) Inventor: Michael Browning Hawkins, Alexandria, VA (US)

(*) Notice: Subject to any disclaimer, the term of this patent is extended or adjusted under 35 U.S.C. 154(b) by 160 days.

(21) Appl. No.: 15/859,662

(22) Filed: Dec. 31, 2017

(65) Prior Publication Data

US 2019/0200534 A1    Jul. 4, 2019

(51) Int. Cl.
*A01G 23/095* (2006.01)
*A01G 3/08* (2006.01)
*B64C 1/06* (2006.01)
*B64C 27/08* (2006.01)
*B64C 39/02* (2006.01)

(52) U.S. Cl.
CPC .......... *A01G 3/085* (2013.01); *A01G 23/095* (2013.01); *B64C 1/063* (2013.01); *B64C 27/08* (2013.01); *B64C 39/024* (2013.01); *B64C 2201/12* (2013.01); *B64C 2201/141* (2013.01); *B64C 2201/146* (2013.01)

(58) Field of Classification Search
CPC ........ A01G 3/085; A01G 3/088; A01G 23/08; A01G 23/083; A01G 23/091; A01G 23/095; A01G 23/0954
See application file for complete search history.

(56) References Cited

U.S. PATENT DOCUMENTS

| 5,709,254 A | * | 1/1998 | Argue | ............... A01G 23/091 |
| | | | | 144/336 |
| 9,795,091 B2 | * | 10/2017 | Lindbom | ............. A01G 23/091 |
| 2018/0257774 A1 | * | 9/2018 | Volpi | ....................... B25J 11/00 |

* cited by examiner

*Primary Examiner* — Matthew Katcoff

(57) ABSTRACT

A device for selectively trimming a tree, the device configured to aerially travel to tree limbs or tree trunks destined for trimming, the device comprising: a transporting assembly configured to aerially transport the device; a tree interface assembly on which is operatively coupled pair(s) of opposing gripping arms disposed to grip the tree therebetween, the tree interface assembly being operatively coupled to the transporting assembly; a transverse rotator comprising a rotational driver configured to rotate the device circumferentially about a tree limb or tree trunk, the transverse rotator being operatively coupled to the tree interface assembly; a cutting assembly comprising at least one cutting mechanism configured to selectively cut a tree limb or tree trunk in multiple planes; wherein the device, once secured to the tree may travel longitudinally along a tree limb or tree trunk to the desired location for trimming.

9 Claims, 9 Drawing Sheets

SELF-PROPELLED TREE TRIMMER

BACKGROUND OF THE INVENTION

Several methods exist for selectively trimming tree limbs or tree trunks. Pole saws are used to selectively trim tree limbs or tree trunks at heights that typically do not exceed 15 feet. Pole saws present disadvantages due to the operator being required to stand nearly under where the cut limb or trunk would fall increasing risk of injury. This type of saw blade cutter is typically pinched by the tree due to the angle at which the operator can cut the tree. Additionally, cutting tree limbs or tree trunks with a pole saw becomes more difficult the more vertically oriented the tree limb or tree trunk. Tree trimming at heights unreachable by pole saw can be accomplished by an operator climbing the tree, or by using a truck equipped with an extendable boom with an operator in a bucket with a saw.

Tree trimming is one of the most dangerous occupations. It is estimated that there are over 40,000 trimming related injuries and an average of 80 deaths per year. With increasing height, the risk of human injury associated with tree climbing methods generally increase. Trimming a tree from a large truck with an extendable boom also presents limitations due to the access area required to position and operate the boom. Tree trimming trucks, due to their size, cannot always access an area where the trimming needs to be performed.

Embodiments of the present invention present advantages over aforementioned methods of tree trimming wherein the risk of human injury is reduced regardless of trimming height as the operator may operate from a location free from the risk of falling, far removed from the area of falling tree branches. Additionally, embodiments of the present invention can be transported practically to remote areas inaccessible to utility trucks. Furthermore, embodiments of the present invention are capable of effectively accessing trees in locations where the area immediately surrounding the tree is wet land, uneven land, or otherwise inaccessible land.

One prior art device comprises a means for trimming high tree limbs without an operator climbing a tree and without a large truck with a boom; however, the device offers distinct disadvantages. US Patent Application, Pub. No.: US 2015/0114520 A1 proposes a motorized chain/bar assembly secured to a small platform that requires lifting for tree delimbing. Although this device may provide a relative decrease in risk to the operator, the act of lifting the device to the operative height possess an inherent risk of injury to the operator as the operator cannot be completely removed from the area of falling limbs or of the tree falling.

Embodiments of the present invention present an advantage over the aforementioned prior art in that the operator can be removed from the site of tree trimming at a distance greater than the height of the entire tree destined for trimming protecting the operator from falling limbs and falling trees. Embodiments of the present invention may be operated at distances greater than that of surrounding trees which additionally protects the operator when surrounding trees are at risk of falling.

The aforementioned prior art device also offers the disadvantage of the inability to be secured to branches with inclinations substantially different than horizontal. Embodiments of the present invention present an advantage over this limitation wherein the embodiments thereof are capable of securing to tree limbs and tree trunks of any inclination including vertical.

Furthermore, the aforementioned prior art device is configured to make a cut in a single plane only. While being effective at trimming at a right angle relative to the long axis of the tree limb or tree trunk, this characteristic is not always practical in trimming tree limbs and tree trunks of inclinations that differ significantly from horizontal.

Embodiments of the present invention overcomes the shortcomings of common tree trimming methods and the prior art by providing an extremely safe method of trimming high tree limbs and tree trunks of nearly any angular orientation. Additionally, embodiments of the present invention overcome limitations that surrounding terrain features place on tree trimming trucks.

SUMMARY OF THE INVENTION

The present invention is a tree trimming device. At least one cutting mechanism, being disposed to cut a tree limb or a tree trunk, is operatively coupled to at least one cutting frame member to comprise a cutting assembly. A tree interface assembly comprises at least one structural member, and at least one pair of opposing gripping arms. The at least one pair of opposing gripping arms is operatively coupled to the at least one structural member. The at least one pair of opposing gripping arms is selectively movable between an open configuration in which a tree is insertable therebetween and a closed configuration in which the pair of opposing gripping arms is able to grip the tree therebetween, the closed configuration adapted to secure the structural member to the tree, the open configuration adapted to release the structural member from the tree. The cutting assembly is operatively coupled to the at least one structural member. A transporting assembly comprising at least one transporting chassis member is configured to transport the device to a position adjacent the tree limb or tree trunk. The transporting assembly is operatively coupled to the tree interface assembly.

BRIEF DESCRIPTION OF THE DRAWINGS

In order that the present invention may be more readily understood and put into practical effect, reference will now be made to the accompanying drawings which illustrate embodiments of the invention and wherein.

DETAILED DESCRIPTION

Figure 1:
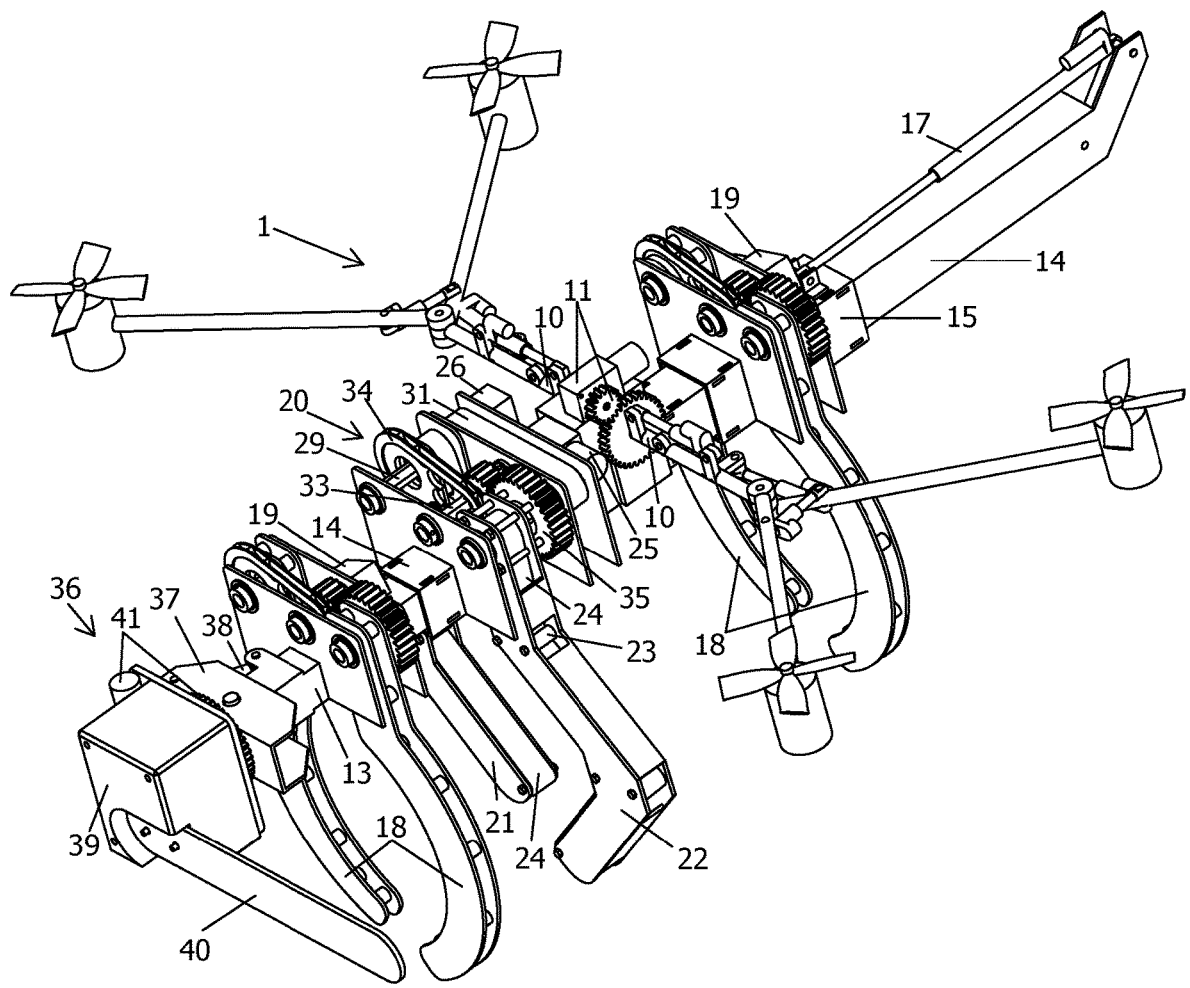
FIG. 1 is a front perspective view of one embodiment of the device according to the present invention shown with the tree interface assembly oriented horizontally with the folding quadcopter in its extended position.
Figure 2:
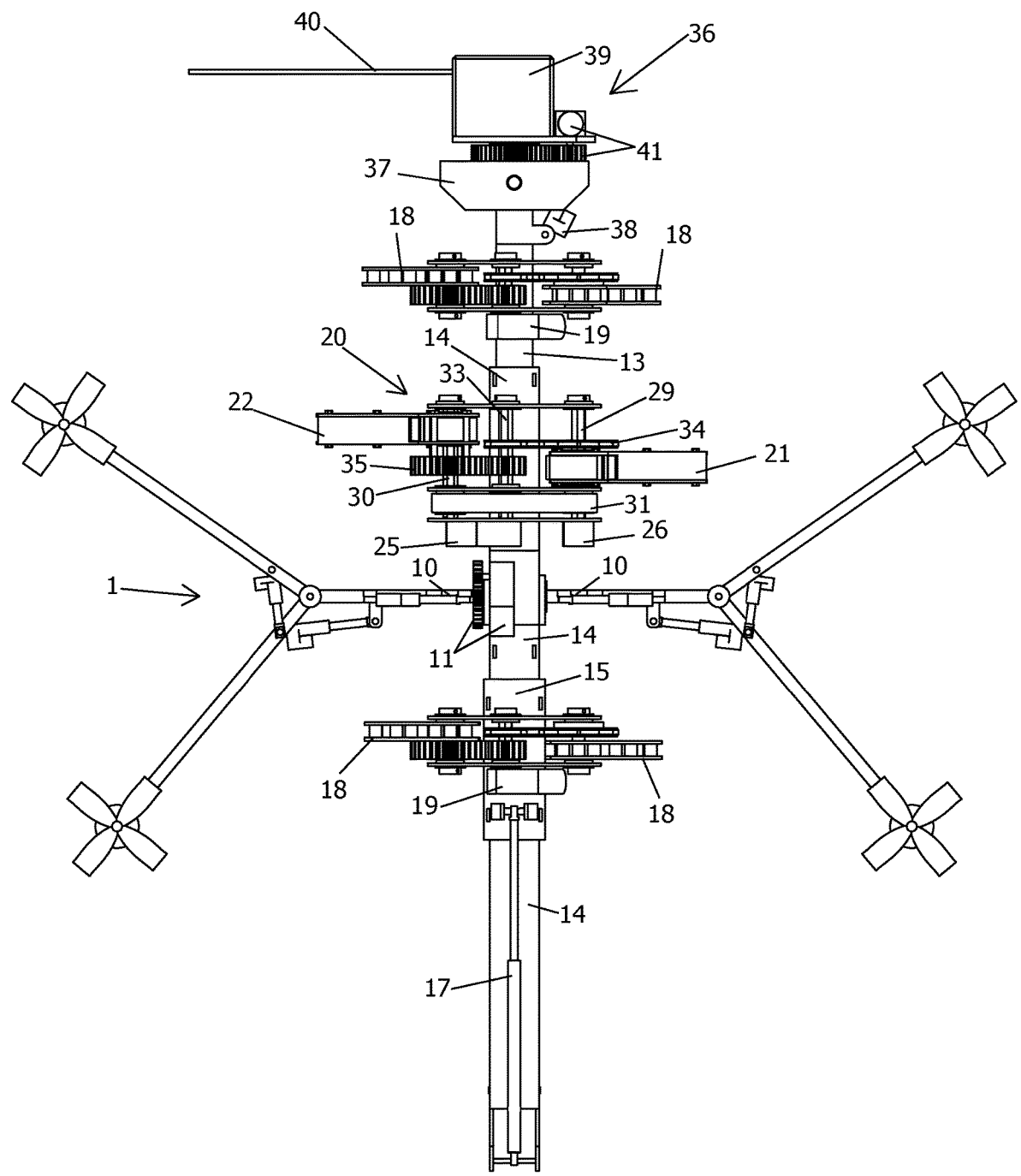
FIG. 2 is a top view of the device of FIG. 1 shown with the front and back of the device oriented at the top and bottom of the page respectively and with the right and left sides facing right and left sides of the page.

The present invention is a self-propelled tree limb and tree trunk trimmer which will hereafter be referred to as the device. One embodiment of the device comprises a transporting assembly 1, 2, a tree interface assembly 12, at least one transverse rotator 20, and a cutting assembly 36. In one embodiment depicted in FIGS. 1 through 3, the transporting assembly is a folding quadcopter 1. The folding quadcopter 1 has a right side and a left side connected by a transporting chassis member 10 of elongate proportion and oriented horizontally. The transporting chassis member 10 may be described as having a long axis that is parallel to the longest dimension of the transporting chassis member 10 and substantially crosses the center thereof. The aspects of the folding quadcopter 1 that extend radially from the central aspect of the quadcopter on which rotors are mounted are configured to fold toward the center of the folding quadcopter 1 when the folding quadcopter 1 is not in flight to allow optimal clearance during other functions. A quadcopter and folding configuration thereof are well known to persons skilled in the art and will not be described here in further detail.

The tree interface assembly 12 may comprise at least one structural member. One embodiment of the present invention depicts the tree interface assembly 12 as comprising three structural members, a first structural member 13, a second structural member 14 located proximal to the first structural member 13, and a third structural member 15 located proximal to the second structural member 14. The first, second, and third structural members 13,14,15 can each be described as having a long axis that is parallel to the longest dimension of the structural member, and substantially crosses the center of the structural member. The first structural member 13 may be slidably coupled to the second structural member 14, and the second structural member 14 may be slidably coupled to the third structural member 15 such that the long axis of the first structural member 13 is substantially parallel to the long axis of the second structural member 14, and the long axis of the second structural member 14 is substantially parallel to the long axis of the third structural member 15.

In one embodiment the structural members may be slidably coupled by a telescoping configuration wherein the first structural member 13 slides linearly into the tube-like structure of the second structural member 14, and the second structural member 14 slides linearly into the tube-like structure of the third structural member 15; however, any configuration in which one structural member is slidably coupled to the adjacent structural member may be employed. While one embodiment depicts the structural members as being constructed from square tubing, any material with sufficient properties may be used.

One embodiment of the tree interface assembly 12 additionally comprises two linear drivers; a first linear driver 16 and a second linear driver 17. The first linear driver 16 is configured to linearly move and maintain the position of the first structural member 13 relative to the second structural member 14. The second linear driver 17 is configured to linearly move and maintain the position of the second structural member 14 relative to the third structural member 15. The first linear driver 16 and second linear driver 17 may comprise a first linear actuator 16 and second linear actuator 17 respectively. While one embodiment depicts linear drivers as linear actuators, any means for generating linear movement and maintaining the linear position of one structural member relative the adjacent structural member may be employed.

The tree interface assembly 12 may be pivotally coupled to the transporting assembly 1, 2. In one embodiment, the second structural member 14 is pivotally coupled to the transporting chassis member 10. A rotational driver "Q" 11 is configured to selectively rotate the second structural member 14 about the long axis of the transporting chassis member 10. In one embodiment the rotational driver "Q" 11 comprises a motor; however, any means for selectively rotating the second structural member 14 about the transporting chassis member 10 may be employed. A means for rotating one structural component about another structural component are well known to persons skilled in the art and therefore will not be described here in any further detail.

In one embodiment the tree interface assembly 12 may also comprise pairs of opposing gripping arms 18. In one embodiment a pair of opposing gripping arms 18 is pivotally coupled to the first structural member 13 and a pair of opposing gripping arms 18 are pivotally coupled to the third structural member 15. Each pair of opposing gripping arms 18 are selectively movable between an open configuration in which a tree is insertable therebetween and a closed configuration in which the pair of opposing gripping arms is able to grip a tree therebetween. The closed configuration thereof secures the associated structural member onto a tree, and the open configuration releases the associated structural member from the tree.

In one embodiment, each pair of opposing gripping arms 18, when moved to the closed configuration around a tree, may apply positive closure force thereby limiting longitudinal and circumferential movement about the tree limb or tree trunk, designated hereafter as a forced closed configuration. Alternatively, each pair of opposing gripping arms 18, when moved to the closed configuration around a tree, may apply a closure force no greater than is needed to prevent the device from falling off the tree, designated hereafter as an unforced closed configuration. The unforced closed configuration limits the longitudinal movement of the pair of opposing gripping arms 18 and the respective structural member but allows circumferential movement around the tree limb or tree trunk. The exterior surface of each opposing gripping arm that makes contact with the tree may be substantially smooth in the circumferential direction of travel thereby reducing friction between the tree and the gripping arms allowing for circumferential movement in the unforced closed configuration.

In one embodiment, pairs of opposing gripping arms 18 may be horizontally offset so that as they close around the tree limb or tree trunk the gripping arms do not interfere with each other. In one embodiment, each pair of opposing gripping arms 18 may be selectively movable between the open, and closed configuration by a rotational driver "G" 19. While one embodiment depicts rotational driver "G" as an electric motor, any means for selectively moving a pair of opposing gripping arms between an open configuration and a closed configuration may be employed. Further detail regarding means for selectively moving a pair of opposing gripping arms such as those described in one embodiment are well known to persons skilled in the art and are not described here in further detail.

In one embodiment a transverse rotator 20 is operatively coupled to the second structural member 14. The transverse rotator 20 may comprise a pair of opposing frames 21, 22, the pair thereof comprising a right opposing frame 21 and a left opposing frame 22. The right and the left opposing frames 21, 22 rotate about axes that are both substantially parallel to the long axis of the second structural member 14. The right and the left opposing frames 21, 22 each have a convex side and a concave side.

In one embodiment the pair of opposing frames 21, 22 is selectively movable between an open configuration in which the tree is insertable therebetween and a closed configuration in which the pair of opposing frames grips the tree therebetween. The open configuration removes restriction of longitudinal movement of the second structural member 14 present in the closed configuration. In one embodiment, the concave side of the right opposing frame 21 substantially faces left, and the concave side of the left opposing frame 22 substantially faces right while the pair of opposing frames are in the closed configuration. In one embodiment a rotational driver "A" 25 may selectively move the pair of opposing frames 21, 22 between the open configuration and the closed configuration simultaneously. While one embodiment depicts rotational driver "A" as an electric motor, any means for selectively moving a pair of opposing frames between an open configuration and a closed configuration may be employed.

The transverse rotator 20 may be configured to rotate the device circumferentially around the tree limb or tree trunk. In one embodiment the transverse rotator 20 comprises at least one series of pulleys 23. In one embodiment, a series of pulleys 23 is journaled within the right opposing frame 21 and a series of pulleys 23 is journaled within the left opposing frame 22. The axis of rotation of each of the pulleys 23 is parallel to the axes of rotation of the right and left opposing frames 21, 22.

Each series of pulleys 23 may be configured to guide at least one friction belt 24 on a path of travel. In one embodiment each series of pulleys 23 guides a friction belt 24 on a path of travel. The path thereof includes the exterior surface of the concave side of each of the opposing frames 21, 22, such that when the pair of opposing frames 21, 22 are in the closed configuration the friction belts 24 make contact with the surface of the tree limb or tree trunk.

In one embodiment the friction belts 24 of the right and the left opposing frames 21, 22 are driven along their paths of travel by a right friction belt drive pulley 27 and a left friction belt drive pulley 28 respectively. The axes of rotation of the right and the left friction belt drive pulleys 27, 28 are the same as the axes of rotation of the right and left opposing frames 21, 22 respectively. The right friction belt drive pulley 27 is mounted on a right friction belt drive shaft 29, and the left friction belt drive pulley 28 is mounted on a left friction belt drive shaft 30. Also mounted on each of the right and the left friction belt drive shafts 29, 30 is a power transfer pulley 32. Rotational power is transferred from the right friction belt drive shaft 29 to the left friction belt drive shaft 30 via a power transfer belt 31 that travels on a path around the power transfer pulleys 32 of both the right and the left friction belt drive shafts 29, 30. The right friction belt drive shaft 29 is selectively rotated directly by a rotational driver "B" 25. In one embodiment, rotational driver "B" 25 drives the movement of both friction belts 24 along their path of travel equally in speed, force and direction. The movement of both friction belts 24 along their paths of travel, in combination with the pairs of opposing gripping arms being in their unforced closed configuration around a tree, and the pair of opposing frames 21, 22 being in the closed configuration around the tree effectively rotates the device circumferentially around the tree limb or tree trunk.

In one embodiment the right and the left opposing frames 21, 22 rotate about the same rotational axes as, and independent of, the right and the left friction belt drive shafts 29, 30 respectively. In one embodiment, the pair of opposing frames 21, 22 are selectively rotated by rotational driver "A" 25. In one embodiment, rotational driver "A" 25 is an electric motor that selectively rotates an opposing frame drive shaft 33. In one embodiment, the opposing frame drive shaft 33 transfers rotational power from rotational driver "A" 25 to the right opposing frame 21 via an opposing frame chain and sprocket set 34; one sprocket of the set thereof is affixed directly to the right opposing frame 21. In one embodiment, an opposing frame gear set 35 transfers rotational power from the opposing frame drive shaft 33 to the left opposing frame 22. One gear of the gear set 35 thereof is mounted directly to the left opposing frame 22.

In one embodiment, rotational driver "A" 25 selectively rotates the right and the left opposing frames 21, 22 equally in speed and force and in opposite directions of rotation simultaneously. While one embodiment depicts a chain and sprocket 34 as a means to transfer power from the opposing frame drive shaft 33 to the right opposing frame 21, any means of transferring rotational power with equivalent speed, force and direction as the rotational power source may be employed. While one embodiment depicts a gear set 35 as a means to transfer power from the opposing frame drive shaft 33 to the left opposing frame 22, any means of transferring rotational power with equivalent speed and force and in the opposite direction as the rotational power source may be employed.

In one embodiment, the cutting assembly 36 may be coupled to the distal end of the tree interface assembly 12, and may comprise at least one cutting frame member 37 on which is coupled a cutting mechanism 39 disposed to cut a tree limb or tree trunk. In one embodiment, the cutting frame member 37, having a proximal side and a distal side, is pivotally coupled to the distal end of the first structural member 13. The cutting frame member 37 is oriented such that the proximal side thereof is substantially facing the distal end of the first structural member 13 while in a resting position. The axis about which the cutting frame member 37 rotates is substantially perpendicular to the long axis of the first structural member 13 and substantially perpendicular to the long axis of the transporting chassis member 10. In one embodiment, rotational driver "C" 38 is configured to selectively rotate the cutting frame member 37 about its described axis of rotation. In one embodiment, rotational driver "C" 38 is a linear actuator pivotally coupled to the cutting frame member 37 a positive distance away from the axis of rotation thereof and pivotally coupled to the first structural member 13 such that a moment arm is created between rotational driver "C" 38 and the rotation axis of the cutting frame member 37. While one embodiment depicts rotational driver "C" 38 as a linear actuator, any means for selectively rotating the cutting frame member 37 about its described axis of rotation may be employed.

In one embodiment the cutting mechanism 39 is operatively coupled to the distal side of the cutting frame member 37. In one embodiment, the cutting mechanism 39 is a chainsaw that is pivotally coupled to the distal side of the cutting frame member 37. The axis about which the chainsaw 39 selectively rotates may be substantially parallel to the long axis of the first structural member 13 when the cutting frame member 37 is in its resting configuration. The bar of the chainsaw 40 may lie in a plane that is substantially perpendicular to the axis about which the chainsaw 39 rotates, such that, when the chainsaw 39 rotates about its axis, the bar 40 and chain thereof are disposed to effectively cut. In one embodiment, rotational driver "s" 41 is configured to drive the cutting mechanism 39 about its described axis of rotation. In one embodiment, rotational driver "s" 41 is a set of two gears driven by an electric motor. While one embodiment depicts rotational driver "s" 41 as an electric motor and set of gears, any means for selectively rotating the cutting mechanism 39 may be employed.

The device according to one embodiment may comprise a control system configured to operate based on a digital or analogue signal remotely received from a human interface device, based on programming or software, based on laser guidance, or based on any other means for robotic control, or any combination thereof. The device may be configured to provide video feedback of the device's operation to the operator.

Operation of One Embodiment

The operation of one embodiment of the present invention that employs the folding quadcopter 1 begins with the folding quadcopter 1 aerially transporting the device from an initial location to the tree limb or tree trunk to be trimmed. As the device aerially approaches the tree limb or tree trunk intended for trimming, the device may travel to a section of the tree limb or tree trunk free of radially extending branches and foliage to an initial grip point. The location of the initial grip point is not required to be the target cut location.

As the device, according to one embodiment, approaches the initial grip point on the tree limb or tree trunk intended for trimming, both pairs of opposing gripping arms and the pair of opposing frames 21, 22 may move to their open configuration. The second structural member 14 may rotate about the transporting chassis member 10 to achieve an angle of inclination relative to gravity that is substantially the same as the angle of inclination of the tree limb or tree trunk intended for trimming. In one embodiment, the second structural member 14 is configured to achieve angles of inclination within a 360 degree range while the orientation of the folding quadcopter 1 remains substantially horizontal.

In one embodiment the folding quadcopter 1 may rotate in a horizontal plane while approaching the tree limb or tree trunk to align the second structural member 14 with the tree limb or tree trunk intended for cutting such that the second structural member 14 is substantially parallel to the tree limb or tree trunk intended for cutting at the initial grip point. With the second structural member 14 substantially parallel to the tree limb or tree trunk intended for trimming at the initial grip point, the device may maneuver aerially to locate both pairs of opposing gripping arms in the open configuration, and the pair of opposing frames 21, 22 in the open configuration around the tree limb or tree trunk intended for trimming such that the tree limb or trunk intended for trimming is substantially between the concave surfaces of each pair of opposing gripping arms 18 and pair of opposing frames 21, 22 in one embodiment.

Figure 3:
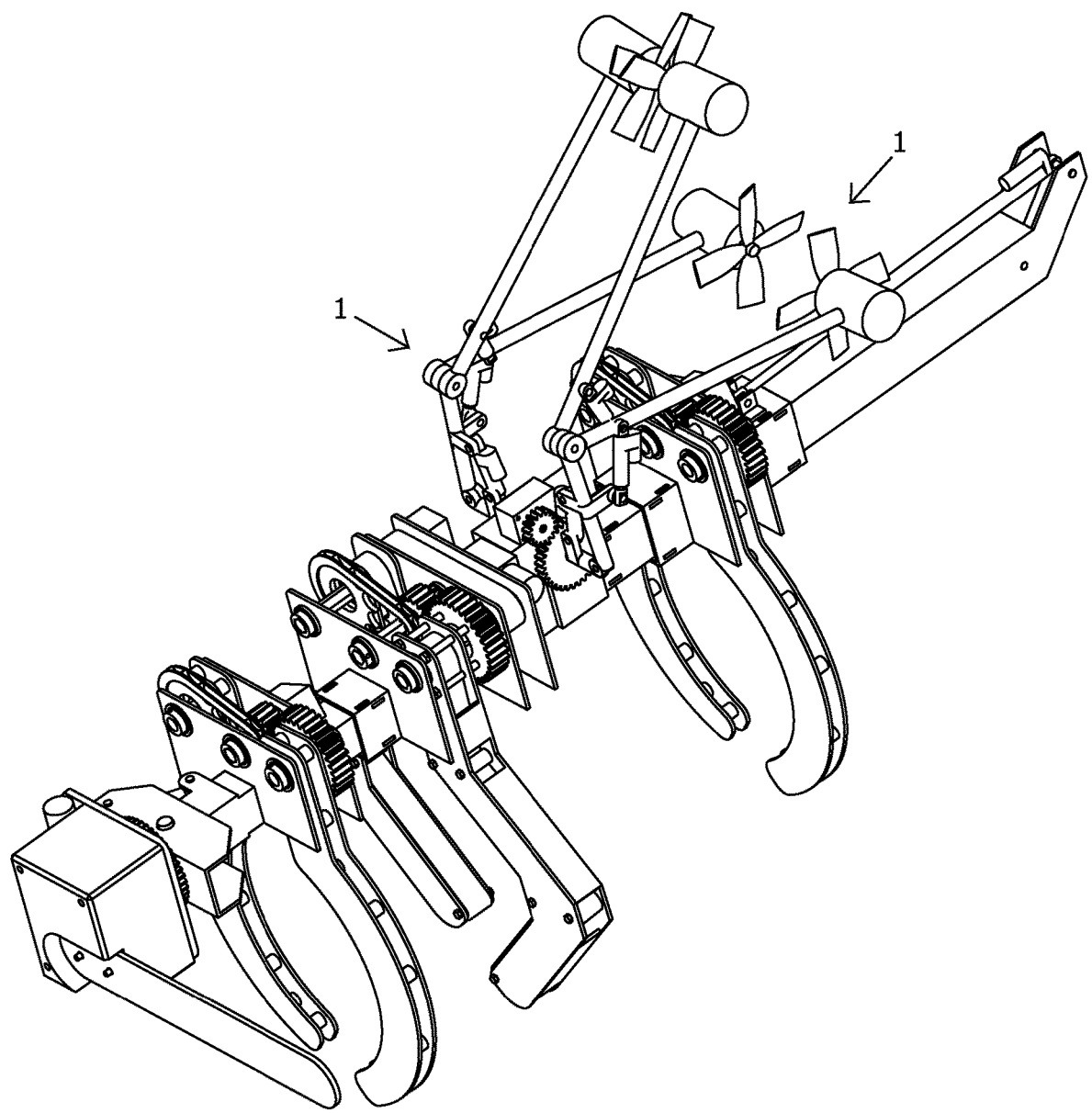
FIG. 3 is a front perspective view of the device of FIG. 1 shown with the quadcopter in the retracted position.

In one embodiment, when both pairs of opposing gripping arms and the pair of opposing frames 21, 22 are around the tree limb or tree trunk intended for trimming at the initial grip point, the pairs of opposing gripping arms 18 move to the forced closed configuration and the pair of opposing frames 21, 22 move to the closed configuration to secure the device to the tree limb or tree trunk. Once the device is secured to the tree limb or tree trunk, the folding quadcopter's rotors may stop rotating. In one embodiment, the aspects of the folding quadcopter 1 that extend radially from the central aspect of the folding quadcopter 1 on which the rotors are mounted may fold inward to allow optimal clearance between branches and foliage while performing subsequent functions. In one embodiment, the folding quadcopter 1 may reposition while in the folded position by rotating about the long axis of the transporting chassis member 10 to provide additional clearance as depicted in FIG. 3.

In one embodiment, when the device is secured to the tree limb or tree trunk at the initial grip point the device may initiate a sequence of functions to travel longitudinally along the length of the tree limb or tree trunk into a position to cut the tree limb or tree trunk at a target cut location.

If the target cut location is distal to the initial grip point, the device in one embodiment may initiate a sequence of distal movements to travel distally along the tree limb or tree trunk to the target cut location. In one embodiment, initiation of movement toward the distal end of a tree limb or tree trunk intended for trimming begins with the pair of opposing gripping arms 18 of the first structural member 13 moving from a closed configuration to an open configuration. The first linear actuator 16 moves the first structural member 13 distally relative to the second structural member 14. During the movement thereof, the pair of opposing frames 21, 22, remains in the closed configuration and the pair of opposing gripping arms 18 of the third structural member 15 remains in the forced closed configuration. Once the first structural member 13 has travelled the extent of available distal movement, the pair of opposing gripping arms 18 of the first structural member 13 moves to the forced closed configuration.

In one embodiment, the pair of opposing frames 21, 22 then move to an open configuration, and the first linear actuator 16 and second linear actuator 17 move the second structural member 14 linearly in a distal direction relative to the first structural member 13 and the third structural member 15. Once the second structural member 14 has travelled the extent of available distal movement, the pair of opposing frames 21, 22 move to a closed configuration.

The pair of opposing gripping arms 18 of the third structural member 15 then move to the open configuration.

The second linear actuator 17 moves the third structural member 15 in a distal direction relative to the second structural member 14. Once the third structural member 15 has travelled the extent of available distal movement, the third structural member's pair of opposing gripping arms 18 move into a forced closed configuration. Once all the structural members have, in turn, completed a distal movement, the device according to one embodiment has completed a full sequence of distal movements. The aforementioned sequence of distal movements may be repeated by each structural member 13, 14, 15, in turn, until the cutting mechanism 39 has reached the target cut location.

If the target cut location is proximal to the initial grip point, the device according to one embodiment initiates a sequence of proximal movements, being substantially the reverse of the aforementioned sequence of distal movements, toward the target cut location. In one embodiment, the sequence may begin with the pair of opposing gripping arms 18 of the third structural member moving from a closed configuration to an open configuration. The second linear actuator 17 moves the third structural member 15 proximally relative to the second structural member 14. The pair of opposing gripping arms 18 of the third structural member moves to the forced closed configuration when the third structural member 15 has travelled the extent of available proximal movement.

In one embodiment, the sequence continues with the pair of opposing frames 21, 22 moving to the open configuration, followed by a proximal movement of the second structural member 14 relative to the first and third structural members 13, 15 driven by the first and second linear actuators 16, 17, followed by the pair of opposing frames 21, 22 moving to the closed configuration. The sequence continues with the first structural member's pair of opposing gripping arms 18 moving to the open configuration, followed by a proximal movement of the first structural member 13 relative to the second structural member 14, driven by the first linear actuator 16, followed by the first structural member's pair of opposing gripping arms 18 moving to the closed configuration. The device may repeat the described sequences of proximal movements as many times as necessary for the cutting mechanism 39 to reach the target cut location.

As the device in one embodiment travels longitudinally along the length of the tree limb or tree trunk, toward the location of the desired cut, the device may encounter branches or foliage extending radially outward from the tree limb or tree trunk that interfere with the path of longitudinal travel. In the case that branches or foliage interfere as described, the transverse rotator 20 may rotate the device circumferentially around the tree limb or tree trunk in a transverse plane relative to the tree limb or tree trunk, with the opposing gripping arms in the unforced closed configuration. The rotation about the tree limb or tree trunk is intended to locate the first, second, and third structural members 13, 14, 15 on a path clear of the interfering branches or foliage. Once the structural members 13, 14, 15 are on an unblocked longitudinal path, the device continues travelling longitudinally toward the target cut location. The device may perform numerous circumferential movements in the course of travelling to the target cut location to remain on a path unblocked by extending branches and foliage. The pairs of opposing gripping arms and pair of opposing frames 21, 22 may open to a greater extent than they would to simply encircle a tree limb or tree trunk if proving advantageous in avoiding contact with the branches or foliage while moving longitudinally past the branches or foliage.

If the initial grip point is the target cut location, the device may initiate a sequence of functions described below to cut the tree limb or tree trunk at the initial grip point.

When the cutting mechanism 39 is at the target cut location, in one embodiment, the transverse rotator 20 rotates the device to locate the chainsaw 39 substantially in the horizontal plane of the tree limb or tree trunk at the target cut location. To prepare for cutting, the pair of opposing frames 21, 22 move to the closed configuration, and the pairs of opposing gripping arms assume forced closed configuration.

In one embodiment, the cutting assembly 36 may perform different cutting processes depending on the angulation of the tree limb or tree trunk relative to gravity. In one embodiment, a first cutting process is used for tree limbs or tree trunks of such horizontal angulation that the tree limb or tree trunk will fall with a cut in a single plane only. To begin the first cutting process, rotational driver "C" 38 rotates the cutting frame member 37 into its resting configuration such that the chainsaw's axis of rotation is substantially parallel to the long axis of the tree limb or tree trunk. Then, rotational driver "s" 41 rotates the chainsaw 39 in the transverse plane of the tree limb or tree trunk such that the chain saw's bar 40 moves through the transverse plane of the tree limb or tree trunk, cutting the tree limb or tree trunk at the target cut location.

In one embodiment, a second cutting process is used to cut tree limbs or tree trunks of such vertical angulation that the tree limb or tree trunk will not fall with a cut in a single plane only. The second cutting process may involve cutting a wedge shaped notch. The notch opening may be placed on the face of the tree limb or tree trunk closest to facing the ground. After the notch is made, a cut is made in the transverse plane of the tree limb or tree trunk beginning from the opposite side of the tree limb or tree trunk as the notch.

In one embodiment, the second cutting process begins with rotational driver "C" 38 rotating the cutting frame member 37 about its axis of rotation to an angle wherein the chainsaw's plane of rotation lies within a first plane. The first plane may be oriented at an angle relative to the transverse plane of the tree limb or tree trunk sufficient to place a lower cut for an adequate wedge shaped notch. In one embodiment, rotational driver "s" 41 then rotates the chainsaw 39 within its plane of rotation performing the lower cut for the notch.

In one embodiment, placing an upper cut for the notch begins with rotational driver "C" 38 rotating the cutting frame member 37 about its rotation axis to an angle wherein the chainsaw's plane of rotation lies within a second plane. The second plane may be at an angle relative to the first plane sufficient to place an upper cut for the wedge shaped notch. In one embodiment, rotational driver "s" 41 then rotates the chainsaw 39 within its plane of rotation performing the upper cut for the notch, the upper cut terminating when the upper cut extends to the lower cut and the wedge is removed.

In one embodiment, the final step in the second cutting process begins with rotational driver "C" 38 rotating the cutting frame member 37 into its resting position wherein the chainsaw's axis of rotation is substantially parallel to the long axis of the tree limb or tree trunk. In one embodiment, rotational driver "s" 41 may then rotate the chainsaw 39 in the transverse plane of the tree limb or tree trunk such that the chain saw 39 cuts the tree limb or tree trunk in the transverse plane starting from the opposite side as the notch at the desired location. The cut thereof is continued to the desired depth to cause the trimmed tree limb or tree trunk to fall.

After completion of the cutting process in one embodiment, the transverse rotator 20 rotates the device in the transverse plane, around the long axis of the tree limb or tree trunk, to a position wherein the folding quadcopter 1 is substantially above the tree limb or tree trunk. In one embodiment, the folding quadcopter 1 then begins the process of transporting the device to the initial location by unfolding. The aspects of the folding quadcopter 1 that originally extended radially from the central aspect of the folding quadcopter 1 on which rotors are mounted return to their original extended position. The folding quadcopter 1 may rotate about the long axis of the transporting chassis member 10 to orient the folding quadcopter 1 in an upright position in which the rotors' axes of rotation are substantially vertical. The folding quadcopter's rotors begin to operate followed by both pairs of opposing gripping arms 18 and the pair of opposing frames 21, 22 moving to the open configuration. Once the device releases the tree limb or tree trunk and is able to move freely, the folding quadcopter 1 transports the device according to one embodiment to the initial position.

Another Embodiment

Figure 4:
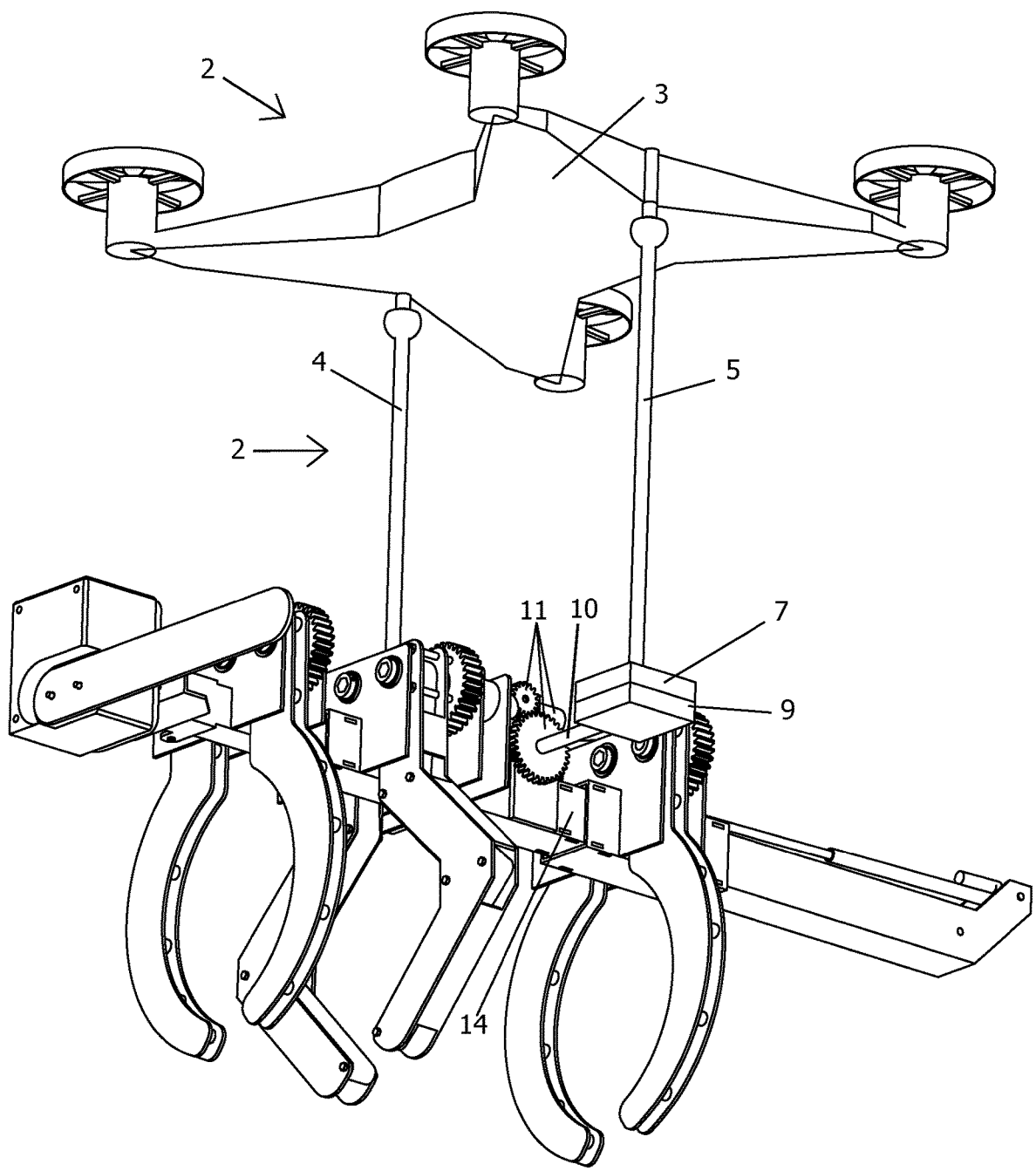
FIG. 4 is a front perspective view of another embodiment of the device according to the present invention shown with the tree interface assembly oriented horizontally. A detachable quadcopter assembly is shown.
Figure 5:
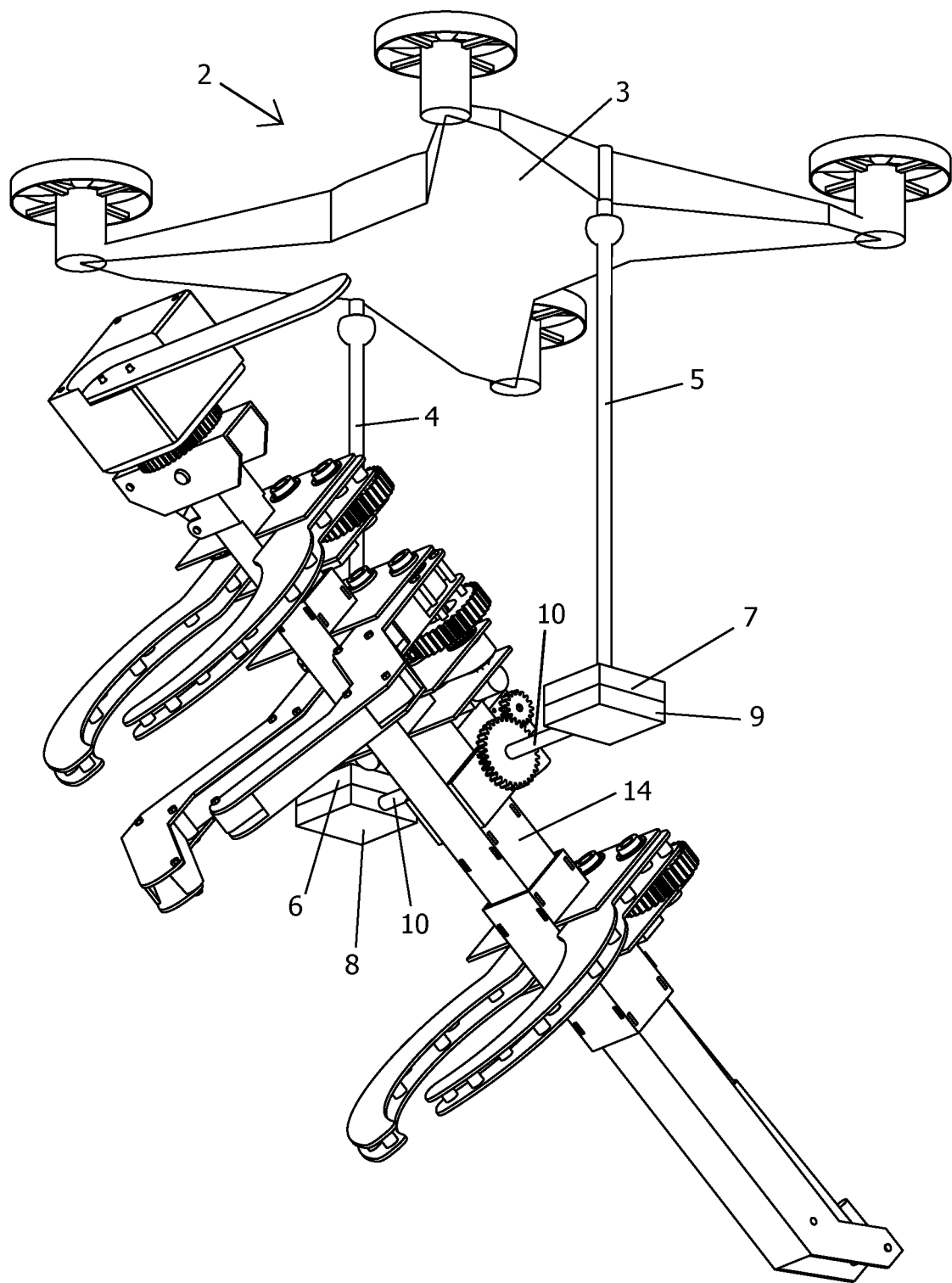
FIG. 5 is a front perspective view of the device of FIG. 4 shown with the tree interface assembly inclined with the front higher than the rear at approximately 50 degrees from horizontal.
Figure 6:
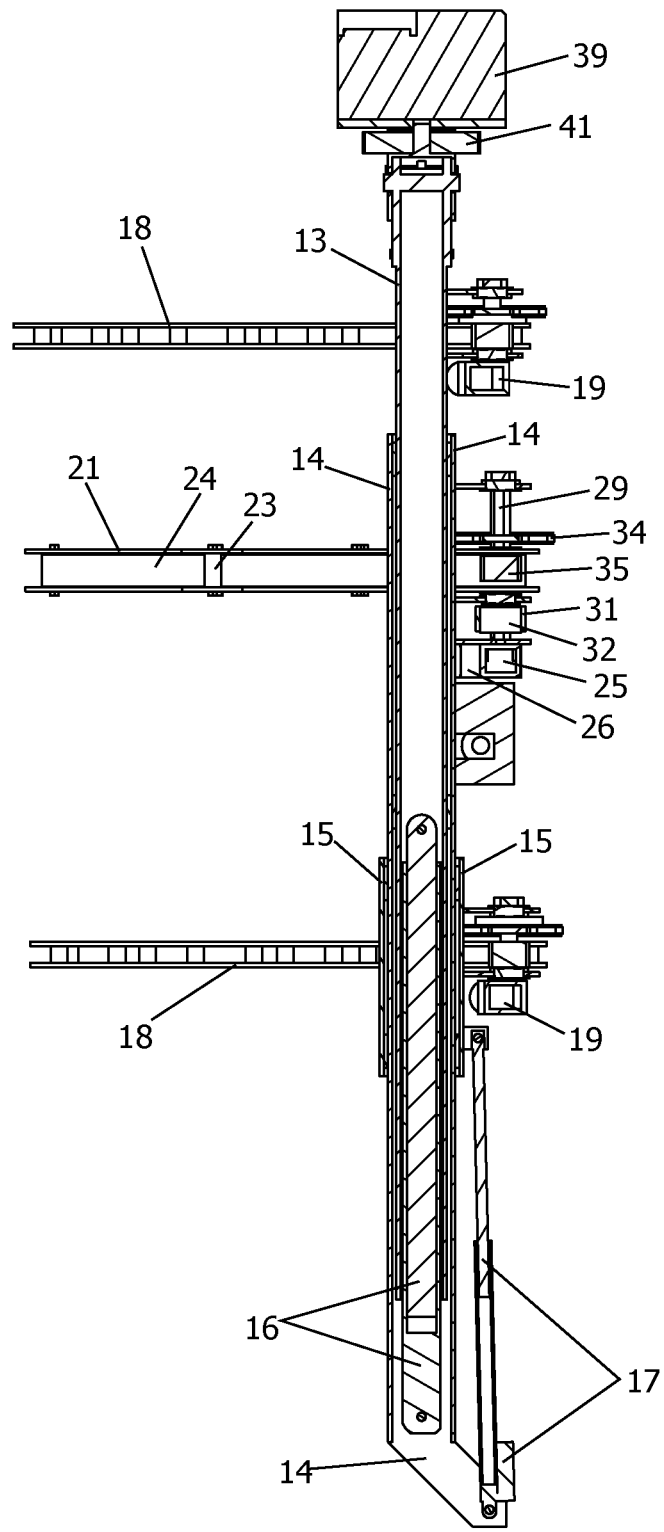
FIG. 6 is a fragmented left side cross-sectional view of the cutting assembly, tree interface assembly (including two pairs of opposing gripping arms), and transverse rotator according to one embodiment and another embodiment. The cross-sectional slice is placed vertically through the long axes of the first, second and/or third structural members. The front end of the device is oriented at the top of the page.
Figure 7:
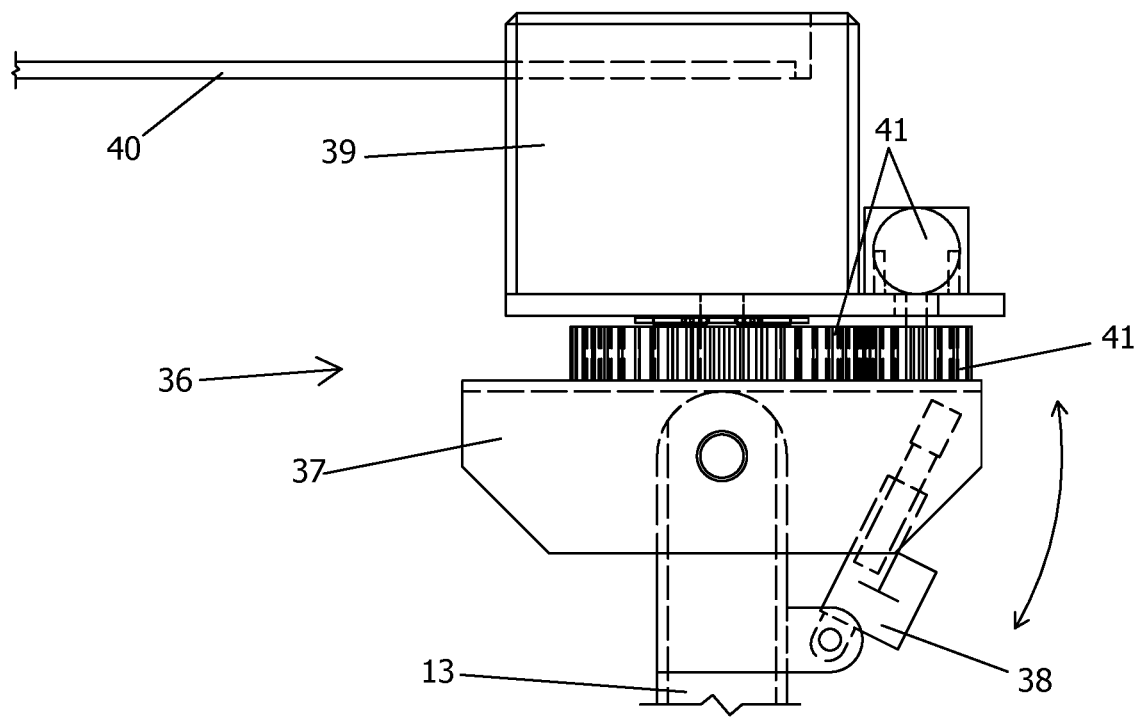
FIG. 7 is a fragmented top view of the cutting assembly and distal end of the first structural member according to one embodiment and another embodiment. Transparency is used to show hidden structures with dashed lines.
Figure 8:
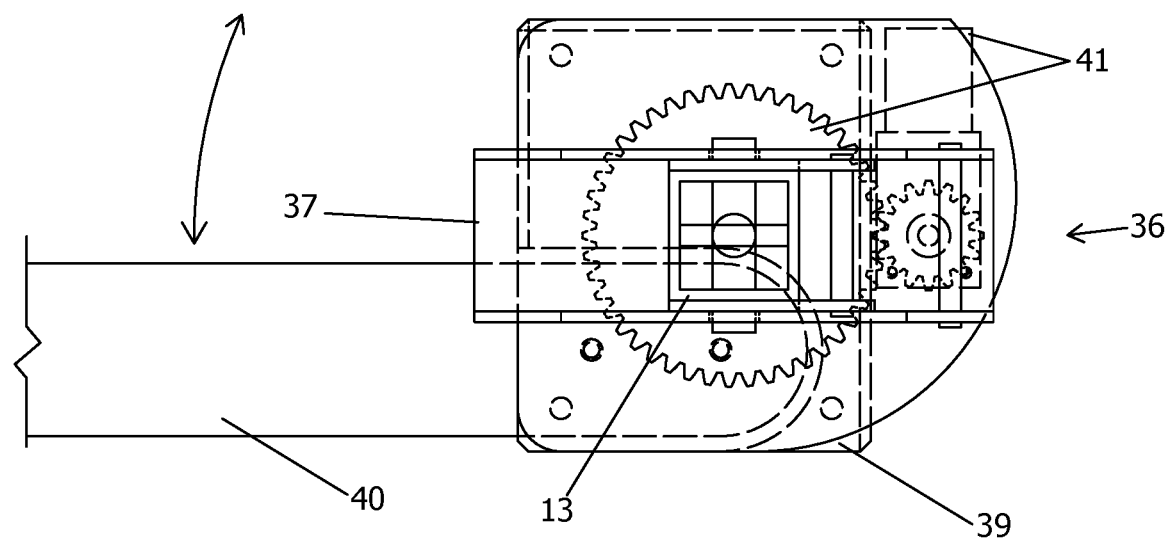
FIG. 8 is a fragmented back view of the cutting assembly and the first structural member according to one embodiment and another embodiment. Transparency is used to show hidden structures with dashed lines.
Figure 9:
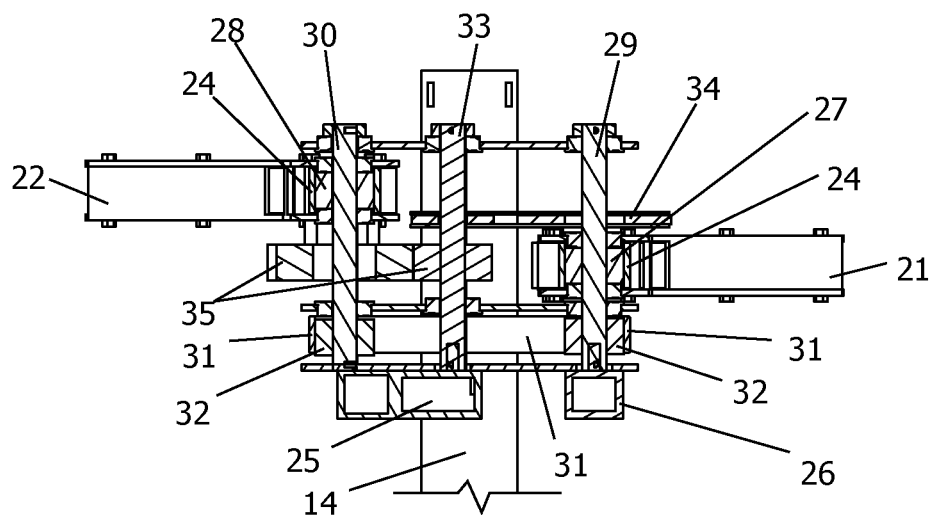
FIG. 9 is a fragmented cross-sectional top view of the transverse rotator and second structural member according to one embodiment and another embodiment. Refer to FIG. 10 for the placement of the plane of the cross-sectional view.
Figure 10:
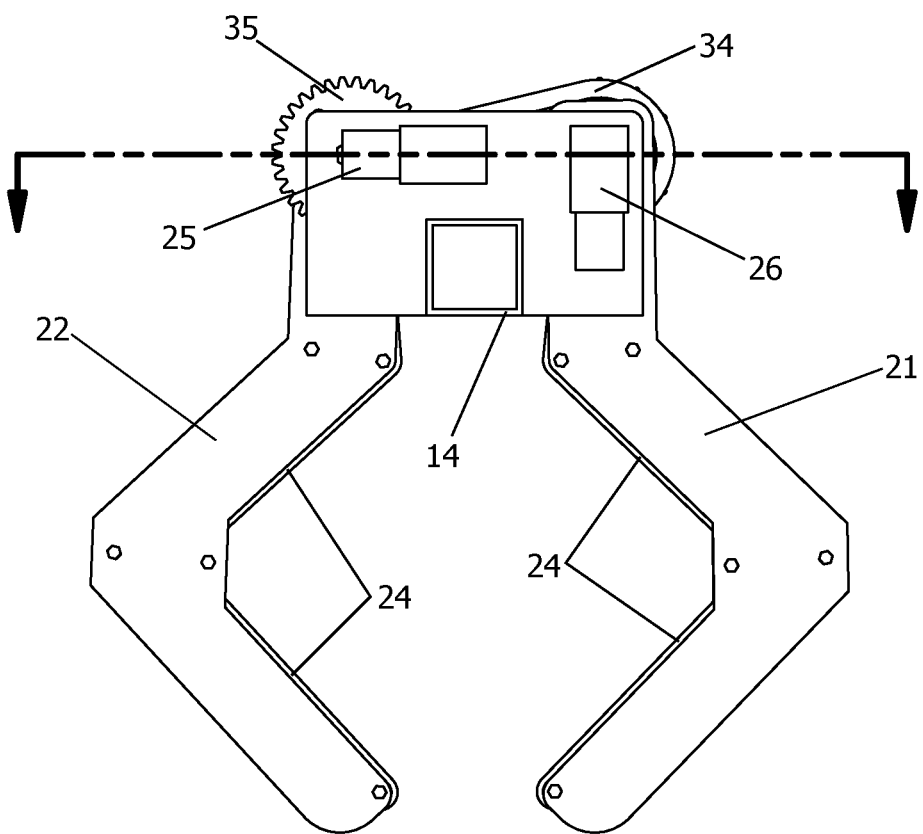
FIG. 10 is a fragmented back view of the transverse rotator and second structural member according to one embodiment and another embodiment. This figure gives reference to the plane of the cross-sectional view in FIG. 9 indicated by the dashed line.
Figure 11:
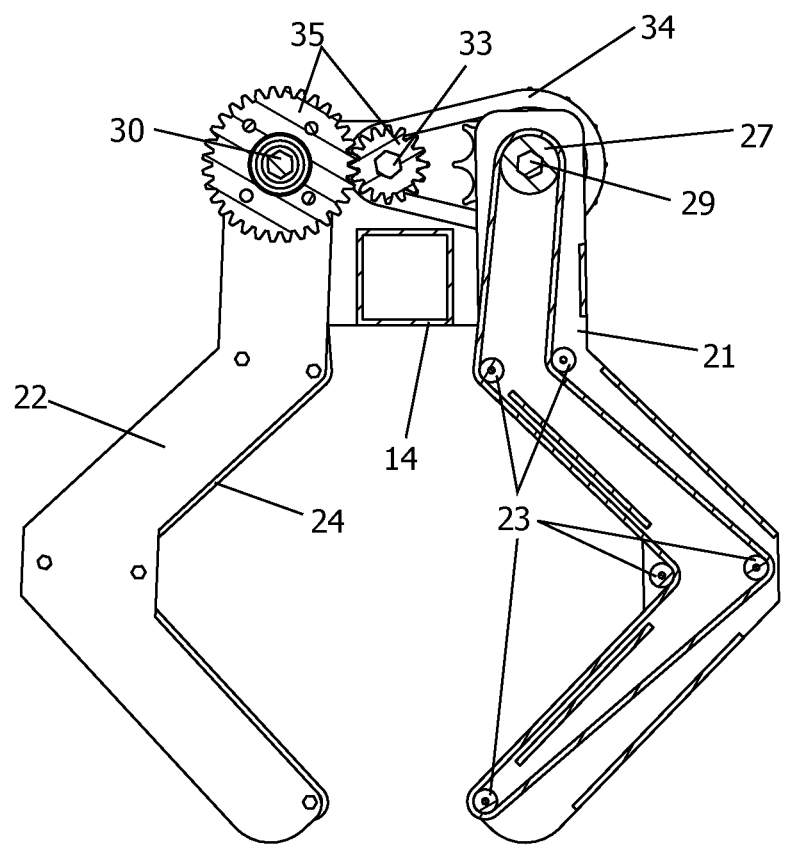
FIG. 11 is a fragmented cross-sectional back view of the transverse rotator and second structural member according to one embodiment and another embodiment. Refer to FIG. 12 for the placement of the plane of the cross-sectional view.
Figure 12:
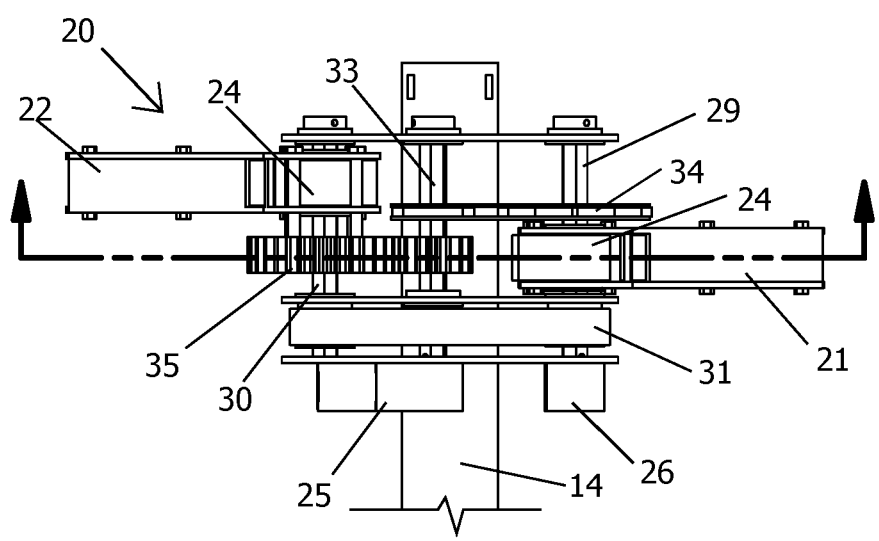
FIG. 12 is a fragmented top view of the transverse rotator and second structural member according to one embodiment and another embodiment. This figure gives reference to the plane of the cross-sectional view in FIG. 11 indicated by the dashed line.

In another embodiment of the device depicted in FIG. 4 and FIG. 5, the transporting assembly is a detaching quadcopter assembly 2. In another embodiment a quadcopter 3 having a top face and bottom face is pivotally coupled to two vertical frame members, a right vertical frame member 4 and a left vertical frame member 5. Each vertical frame member has a top end and a bottom end. In another embodiment, the bottom face of the quadcopter 3 may be pivotally coupled to the top end of each of the two vertical frame members. In another embodiment, the bottom end of each of the vertical frame members may be coupled to an electromagnet. The bottom end of the right vertical frame member 4 may be coupled to a right electromagnet 6 and the bottom end of the left vertical frame member 5 may be coupled to a left electromagnet 7.

In another embodiment, a right and a left ferrous plate 8, 9 each having a top face and a bottom face are configured to separably couple to the right and left electromagnets 6, 7 respectively. In another embodiment, the right ferrous plate 8 and the left ferrous plate 9 are joined by a transporting chassis member 10. The transporting chassis member 10 has an elongate proportion, has a right end and a left end, and is oriented horizontally. The transporting chassis member 10 can be described as having a long axis that is parallel to the longest dimension of the transporting chassis member 10 and substantially crosses the center thereof.

In another embodiment, the bottom face of the right ferrous plate 8 is mounted on the cylindrical surface at the right end of the transporting chassis member 10. The bottom face of the left ferrous plate 9 is mounted on the cylindrical surface at the left end of the transporting chassis member 10. In another embodiment, the top faces of both the right and left ferrous plates 8, 9 are configured to face the same direction and to mate with the right and the left electromagnets 6, 7 respectively.

In another embodiment, in a manner identical to the previously described embodiment, a second structural member 14 is pivotally coupled to the transporting chassis member 10, and a rotational driver "Q" 11 is configured to rotate the second structural member 14 about the long axis of the transporting chassis member 10.

The differences between one embodiment described in a prior section, and another embodiment have been described here in detail. The remaining detailed description of another embodiment is identical to the one embodiment previously described and will not be further described here.

Operation of Another Embodiment

The operation of another embodiment of the device that employs the detaching quadcopter assembly 2 generally varies from the operation of the one embodiment in that a portion of the detaching quadcopter assembly 2, including the quadcopter 3, detaches from the rest of the device, once the tree interface assembly 12 secures the device to the tree limb or tree trunk. The detached portion of the detaching quadcopter assembly 2 reattaches once tree limb or tree trunk has been trimmed.

The operation of another embodiment begins with the quadcopter 3 aerially transporting the device from an initial location to the location of the tree limb or tree trunk to be trimmed. The device controls may be configured to operate based on a digital or analogue signal remotely received from a human interface device, based on programming or software, based on laser guidance, or based on any other means for robotic control, or any combination thereof. The device may be configured to provide video feedback of the device's operation to the operator.

As the device, according to another embodiment, aerially approaches the tree limb or tree trunk intended for trimming, the device may, like in one embodiment previously described, travel to a section of the tree limb or tree trunk free of branches to an initial grip point. The location of the initial grip point is not required to be the target cut location.

In another embodiment, as the device approaches the initial grip point on the tree limb or tree trunk intended for trimming, the pairs of opposing gripping arms and pair of opposing frames 21, 22 move to their open configuration. The second structural member 14 may rotate about the transporting chassis member to achieve an angle of inclination relative to gravity that is substantially the same as the angle of inclination of the tree limb or tree trunk intended for trimming. In another embodiment, the second structural member 14 is configured to achieve angles of inclination within a 360 degree range while the orientation of the quadcopter 3 remains substantially horizontal.

The quadcopter 3 may rotate in the horizontal plane while approaching the tree limb or tree trunk to align the second structural member 14 with the tree limb or tree trunk intended for cutting such that the second structural member 14 is substantially parallel to the tree limb or tree trunk at the initial grip point. With the second structural member 14 substantially parallel to the tree limb or tree trunk intended for trimming at the initial grip point, the device maneuvers aerially to locate all pairs of opposing gripping arms in the open configuration, and the pair of opposing frames 21, 22 in the open configuration around the tree limb or tree trunk intended for trimming such that the tree limb or trunk intended for trimming is substantially between the concave surfaces of each pair of opposing gripping arms 18 and transverse rotator opposing frames 21, 22.

With the pairs of opposing gripping arms and the pair of opposing frames 21, 22 around the tree limb or tree trunk intended for trimming at the initial grip point, the pairs of opposing gripping arms move to the forced closed configuration and the pair of opposing frames 21, 22 move to the closed configuration to secure the device to the tree. Once the device is secured to the tree, the electromagnets uncouple from the ferrous plates, detaching the quadcopter 3 and a portion of the detaching quadcopter assembly 2 from the rest of the device. The quadcopter 3 then flies to a position where it will remain until it transports the device from the tree limb or tree trunk back to the initial position.

In another embodiment, the operation of the device with the quadcopter detached, from the time it is secured to the tree limb or tree trunk until the time the device has cut the tree limb or tree trunk comprises the same steps and processes as the operation of the previously described embodiment. Because the described steps and processes of operating the device are substantially the same as the previously described embodiment, it will not be described here in detail.

In another embodiment, after the device completes the cut, the transverse rotator 20 rotates the device in the transverse plane, about the long axis of the tree limb or tree trunk to a position wherein the transporting chassis member 10 is substantially above the tree limb or tree trunk. The transporting chassis member 10 then rotates about its long axis such that the top face of both the right and left ferrous plates 8, 9 are facing substantially upward.

The quadcopter 3 then flies to a position substantially above the device according to another embodiment. The quadcopter 3 slowly descends with the right electromagnet 6 vertically aligned above the right ferrous plate 8, and the left electromagnet 7 vertically aligned above the left ferrous plate 9 until the right and left electromagnet 6,7 attach to the right and left ferrous plate 8,9 respectively. In another embodiment, when the detaching quadcopter assembly 2 reattaches to the rest of the device, the quadcopter's rotors begin to rotate followed by an opening of the pairs of opposing gripping arms and the pair of opposing frames 21, 22. Once the device releases the tree limb or tree trunk, the quadcopter 3 transports the device to the initial position.

While the aforementioned has been given by way of illustrative example of the present invention, all such and other modifications and variations thereto as would be apparent to persons skilled in the art are deemed to fall within the broad scope and extent of the present invention as defined in the claims appended hereto.

What is claimed is:

1. A tree trimming device comprising:
   a cutting assembly comprising at least one cutting frame member on which at least one cutting mechanism is operatively coupled, the at least one cutting mechanism being disposed to cut a tree limb or a tree trunk;
   a tree interface assembly comprising at least one structural member and at least one pair of opposing gripping arms wherein:
      the at least one structural member is operatively coupled to the at least one pair of opposing gripping arms, the pair of opposing gripping arms being selectively movable between an open configuration in which a tree is insertable therebetween and a closed configuration in which the pair of opposing gripping arms is able to grip the tree therebetween, the closed configuration adapted to secure the structural member to the tree, the open configuration adapted to release the structural member from the tree; and
      the cutting assembly is operatively coupled to the at least one structural member; and
   a transporting assembly comprising at least one transporting chassis member to which the tree interface assembly is operatively coupled, the transporting assembly being configured to aerially transport the tree trimming device from an initial location to a location immediately adjacent a tree limb or tree trunk;
   wherein:
   the transporting assembly is a folding quadcopter;
   the folding quadcopter extends from a first side to a second side;
   the at least one transporting chassis member is of substantially elongate shape and of substantially horizontal orientation, extending from the first side of the folding quadcopter to the second side thereof, substantially connecting the first side of the folding quadcopter to the second side thereof;
   the folding quadcopter is configured to allow the tree interface assembly to rotate about the transporting chassis member without interference from the folding quadcopter or any component thereof.

2. The tree trimming device of claim 1, wherein:
   the tree trimming device further comprises a rotational driver "Q" configured to rotate the tree interface assembly about the transporting chassis member.

3. A tree trimming device comprising:
   a cutting assembly comprising at least one cutting frame member on which at least one cutting mechanism is operatively coupled, the at least one cutting mechanism being disposed to cut a tree limb or a tree trunk;
   a tree interface assembly comprising at least one structural member and at least one pair of opposing gripping arms wherein:
      the at least one structural member is operatively coupled to the at least one pair of opposing gripping arms, the pair of opposing gripping arms being selectively movable between an open configuration in which a tree is insertable therebetween and a closed configuration in which the pair of opposing gripping arms is able to grip the tree therebetween, the closed configuration adapted to secure the structural member to the tree, the open configuration adapted to release the structural member from the tree; and
      the cutting assembly is operatively coupled to the at least one structural member; and
   a transporting assembly comprising at least one transporting chassis member to which the tree interface assembly is operatively coupled, the transporting assembly being configured to aerially transport the tree trimming device from an initial location to a location immediately adjacent a tree limb or tree trunk wherein the transporting assembly is a quadcopter assembly comprising:
   a quadcopter having a top face and a bottom face;
   at least one vertical frame member extending from a top end to a bottom end, the top end being operatively coupled to the bottom face of the quadcopter; and
   at least one separable coupling comprising a top coupler and a bottom coupler, the top coupler being operatively coupled to the bottom end of the vertical frame member, the bottom coupler being operatively coupled to the at least one transporting chassis member;
   wherein:
   the top coupler of the at least one separable coupling comprises an electromagnet that is operatively coupled to the bottom end of the at least one vertical frame member;

the bottom coupler of the at least one separable coupling comprises a ferrous plate, the ferrous plate being operatively coupled to the transporting chassis member.

4. The tree trimming device of claim 3, wherein:

the at least one transporting chassis member extends from a first end to a second end, is of substantially elongate shape and is of substantially horizontal orientation;

the at least one vertical frame member is two vertical frame members comprising a first vertical frame member, and a second vertical frame member;

the at least one separable coupling is two separable couplings, a first separable coupling and a second separable coupling;

the top coupler of both the first and the second separable couplings comprises an electromagnet that are operatively coupled to the bottom end of the first and the second vertical frame members respectively;

the bottom coupler of both the first and the second separable couplings comprises a ferrous plate, the ferrous plates being operatively coupled to the first end and the second end of the transporting chassis member respectively;

a rotational driver "Q" is configured to rotate the tree interface assembly about the at least one transporting chassis member; and the combined vertical height of the right or left vertical frame member, and the right or left separable coupling allows sufficient vertical distance between the transporting chassis member and the bottom face of the quadcopter for the tree interface assembly and cutting assembly to rotate about the transporting chassis member without interference from the transport assembly or any portion thereof.

5. The tree trimming device of claim 1, wherein at least one of the at least one pair of opposing gripping arms is a transverse rotator assembly configured to rotate the device circumferentially about a tree limb or a tree trunk, the transverse rotator assembly comprising:

a pair of opposing arm frames comprising a right opposing arm frame and a left opposing arm frame, both the right and the left opposing arm frames having a convex side and a concave side, the concave side of the right opposing arm frame substantially facing the concave side of the left opposing arm frame wherein the pair of opposing arm frames are selectively movable between an open configuration in which the tree is insertable therebetween and a closed configuration in which the pair of opposing arm frames is able to grip the tree therebetween, the closed configuration adapted to secure the structural member to the tree, the open configuration adapted to release the structural member from the tree;

a series of pulleys journaled within at least one of the opposing arm frames;

at least one friction belt guided on a path by the series of pulleys, the series of pulleys configured to guide the friction belt under tension on the exterior surface of the concave side of the arm frame(s), such that when the pair of opposing arm frames are in the closed configuration the friction belt makes contact with the surface of the tree limb or tree trunk;

at least one drive pulley configured to convert rotational power into movement of the friction belt along its path; and a rotational driver "R" configured to rotate the at least one drive pulley.

6. The tree trimming device of claim 1 wherein:

the at least one pair of opposing gripping arms is three pairs of opposing gripping arms;

the at least one structural member is three structural members comprising a first structural member, a second structural member, and a third structural member, each structural member extending from a proximal end to a distal end;

the first structural member, second structural member, and third structural member each have a long axis that is parallel to the longest length dimension of the respective structural member, and substantially crosses the center of the structural member;

the first structural member is positioned distal to the second and third structural members, the third structural member is positioned proximal to the first and second structural members, and the second structural member is positioned between the first and third structural members, each structural member having a substantially elongate proportion;

each structural member is slidably coupled to the adjacent structural member such that the long axis of the first structural member is substantially parallel to the long axis of the second structural member, and the long axis of the second structural member is substantially parallel to the long axis of the third structural member;

the device further comprises a first linear driver and a second linear driver, the first linear driver configured to adjust and maintain the relative position of the first structural member to the second structural member, the second linear driver configured to adjust and maintain the relative position of the second structural member to the third structural member; and the three structural members are pivotally coupled to the three pairs of opposing gripping arms, each of the three structural members pivotally coupled to one of the three pairs of opposing gripping arms.

7. The tree trimming device of claim 6 wherein at least one of the three pairs of opposing gripping arms is a transverse rotator assembly, the transverse rotator assembly configured to rotate the device circumferentially about a tree limb or a tree trunk, the transverse rotator assembly comprising:

a pair of opposing arm frames comprising a right opposing arm frame and a left opposing arm frame, both the right and the left opposing arm frames having a convex side and a concave side, the concave side of the right opposing arm frame substantially facing the concave side of the left opposing arm frame wherein the pair of opposing arm frames are selectively movable between an open configuration in which the tree is insertable therebetween and a closed configuration in which the pair of opposing arm frames is able to grip the tree therebetween, the closed configuration adapted to secure the structural member to the tree, the open configuration adapted to release the structural member from the tree;

a series of pulleys journaled within at least one of the opposing arm frames;

at least one friction belt guided on a path by the series of pulleys, the series of pulleys configured to guide the friction belt under tension on the exterior surface of the concave side of the arm frame(s), such that when the pair of opposing arm frames are in the closed configuration the friction belt makes contact with the surface of the tree limb or tree trunk;

at least one drive pulley configured to convert rotational power into movement of the friction belt along its path; and a rotational driver "R" configured to rotate the at least one drive pulley.

8. The tree trimming device of claim 1 wherein:

the at least one structural member extends from a proximal end to a distal end;

the at least one cutting frame member extends from a proximal side and a distal side;

the cutting frame member is pivotally coupled to the distal end of the at least one structural member such that in a resting state the proximal side of the cutting frame member is substantially facing the distal end of the at least one structural member, the cutting frame member configured to rotate relative to the at least one structural member about at least one axis; and the cutting assembly further comprises a rotational driver "C" configured to rotate the cutting frame member about the at least one axis;

the at least one axis around which the cutting frame member is configured to rotate is a first axis;

the cutting mechanism is pivotally coupled to the distal side of the cutting frame member, the cutting mechanism configured to rotate about a second axis disposed at an angle relative to the first axis;

the second axis is not parallel to the first axis;

the rotational driver "C" is configured to rotate the cutting frame member about the first axis; and the cutting assembly further comprises a rotational driver "S" configured to rotate the cutting mechanism about the second axis.

9. The tree trimming device of claim 7 wherein:

the cutting mechanism is a chainsaw;

the at least one cutting frame member is a cutting frame member extending from a proximal side to a distal side;

the cutting frame member is pivotally coupled to the distal end of the first structural member such that in a resting state the proximal side of the cutting frame member substantially faces the distal end of the first structural member;

the cutting frame member is configured to rotate about a first axis that is substantially perpendicular to the long axis of the first structural member;

the chainsaw is pivotally coupled to the distal side of the cutting frame member, the chainsaw configured to rotate about a second axis disposed at an angle relative to the first axis;

the second axis is substantially parallel to the long axis of the first structural member when the cutting frame member is in the resting state; and the cutting assembly further comprises two rotational drivers comprising a rotational driver "C" and a rotational driver "S", rotational driver "C" configured to rotate the cutting frame member about the first axis, and rotational driver "S" is configured to rotate the chainsaw about the second axis.

* * * * *